(12) United States Patent
Fukuchi (10) Patent No.: US 12,066,303 B2
(45) Date of Patent: Aug. 20, 2024

(54) PHYSICAL QUANTITY SENSOR-FIXING STRUCTURE

(71) Applicant: Hitachi Metals, Ltd., Tokyo (JP)

(72) Inventor: Keisuke Fukuchi, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 202 days.

(21) Appl. No.: 17/558,681

(22) Filed: Dec. 22, 2021

(65) Prior Publication Data

US 2022/0221361 A1 Jul. 14, 2022

(30) Foreign Application Priority Data

Jan. 12, 2021 (JP) ................................ 2021-002799

(51) Int. Cl.

| | |
|---|---|
| G01D 11/24 | (2006.01) |
| G01D 11/30 | (2006.01) |
| G01D 21/02 | (2006.01) |
| G01K 1/08 | (2021.01) |
| G01K 7/02 | (2021.01) |
| G01K 7/16 | (2006.01) |
| G01K 7/22 | (2006.01) |
| G01L 19/00 | (2006.01) |
| G01M 15/05 | (2006.01) |

(52) U.S. Cl.
CPC ........... *G01D 11/245* (2013.01); *G01D 11/30* (2013.01); *G01D 21/02* (2013.01); *G01K 1/08* (2013.01); *G01K 7/02* (2013.01); *G01K 7/16* (2013.01); *G01K 7/22* (2013.01); *G01L 19/0092* (2013.01); *G01M 15/05* (2013.01)

(58) Field of Classification Search
CPC ...... G01D 11/30; G01D 11/245; G01D 21/02; G01K 1/08; G01K 7/02; G01K 7/16; G01K 7/22; G01L 19/0092; G01M 15/05
See application file for complete search history.

(56) References Cited

U.S. PATENT DOCUMENTS

| | | | |
|---|---|---|---|
| 9,417,344 B1 * | 8/2016 | van Arendonk .. H01L 27/14663 | |
| 2005/0210990 A1 * | 9/2005 | Hayashi ................. G01L 23/24 | |
| | | | 73/708 |

(Continued)

FOREIGN PATENT DOCUMENTS

| | | | | |
|---|---|---|---|---|
| CN | 105784180 A | * | 7/2016 | ............... G01K 7/22 |
| JP | 2013-44693 A | | 3/2013 | |

(Continued)

OTHER PUBLICATIONS

Japanese Office Action, dated Feb. 20, 2024 in Japanese Application No. 2021-002799 and English Translation thereof.

*Primary Examiner* — Benjamin R Schmitt
(74) *Attorney, Agent, or Firm* — MCGINN I.P. LAW GROUP, PLLC.

(57) ABSTRACT

A physical quantity sensor-fixing structure includes a holder holding a physical quantity sensor including a detection unit to detect a physical quantity and a plurality of lead wires connected to the detection unit. The holder fixes the physical quantity sensor to a plurality of conductive support members to be respectively connected to the plurality of lead wires. The holder includes a main body member including a housing portion to house at least a portion of the physical quantity sensor, and a lid member covering at least a portion of the housing portion.

19 Claims, 5 Drawing Sheets

(56) References Cited

U.S. PATENT DOCUMENTS

2006/0014404 A1* 1/2006 Iwamoto .............. G01D 11/245
                                                        439/76.2
2018/0023981 A1* 1/2018 Forwerck ................ G01P 1/023
                                                        73/866.5

FOREIGN PATENT DOCUMENTS

JP            2020-180944 A      11/2020
WO      WO-2005001404 A1 *    1/2005  ............... G01K 1/08

* cited by examiner

PHYSICAL QUANTITY SENSOR-FIXING STRUCTURE

CROSS-REFERENCE TO RELATED APPLICATIONS

The present patent application claims the priority of Japanese patent application No. 2021-002799 filed on Jan. 12, 2021, and the entire contents of Japanese patent application No. 2021-002799 are hereby incorporated by reference.

TECHNICAL FIELD

The present invention relates to a physical quantity sensor-fixing structure.

BACKGROUND ART

Conventionally, vehicles are equipped with physical quantity sensors that detect various physical quantities. For example, Patent Literature 1 discloses an integrated temperature and pressure sensor device to detect temperature and pressure in an intake manifold of an internal combustion engine.

This integrated temperature and pressure sensor device includes a pressure sensor cell, a temperature sensor, pressure sensor terminals, temperature sensor terminals, and a resin case housing these components. The case is made of an overmold resin member and a premold resin member. The temperature sensor has a temperature sensing element and a lead wire electrically connected to the temperature sensor terminal, and is configured in such a manner that the lead wire is connected to the temperature sensor terminal inside the premold. The temperature sensing element is arranged on the inner side of a guard provided to prevent collision with foreign matter flowing into the intake manifold, and the lead wire is led out of the premold on the inner side of the guard. The temperature sensing element is supported by the lead wire being led out of the premold without being in contact (in a contactless manner) with the guard.

CITATION LIST

Patent Literature

Patent Literature 1: JP 2020-180944A

SUMMARY OF THE INVENTION

In the integrated temperature and pressure sensor device described in Patent Literature 1, since the temperature sensing element of the temperature sensor is supported by the lead wire, the temperature sensing element is likely to be shaken by, e.g., vibration of the internal combustion engine, which may raise concerns about durability depending on the mounting position of the sensor device. In addition, when the temperature sensor is used to detect, e.g., temperature of a heat-generating portion such as electric motor or electric wire, temperature detection accuracy may decrease due to changes in a distance between the temperature sensing element and the heat-generating portion caused by vibration.

Therefore, it is an object of the invention to provide a physical quantity sensor-fixing structure, in which a physical quantity sensor having a detection unit to detect a physical quantity and lead wires can be supported, with increased support rigidity, on conductive support members connected to the lead wires.

So as to achieve the above object, one aspect of the invention provides a physical quantity sensor-fixing structure, comprising:
  a holder holding a physical quantity sensor comprising a detection unit to detect a physical quantity and a plurality of lead wires connected to the detection unit, the holder fixing the physical quantity sensor to a plurality of conductive support members to be respectively connected to the plurality of lead wires,
  wherein the holder comprises a main body member comprising a housing portion to house at least a portion of the physical quantity sensor, and a lid member covering at least a portion of the housing portion.

Effect of the Invention

According to the present invention, it is possible to provide a physical quantity sensor-fixing structure, in which a physical quantity sensor having a detection unit to detect a physical quantity and lead wires can be supported, with increased support rigidity, on conductive support members connected to the lead wires.

BEST MODE FOR CARRYING OUT THE INVENTION

Embodiment

Figure 1:
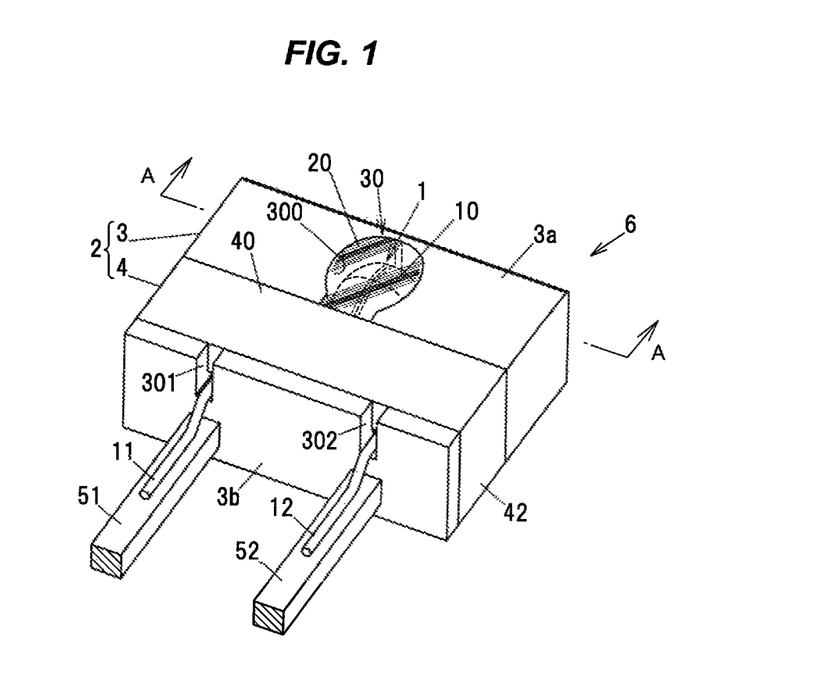
FIG. 1 is a perspective view showing a holder integrated-type physical quantity detection device to which a physical quantity sensor-fixing structure in an embodiment of the present invention is applied.
Figure 2:
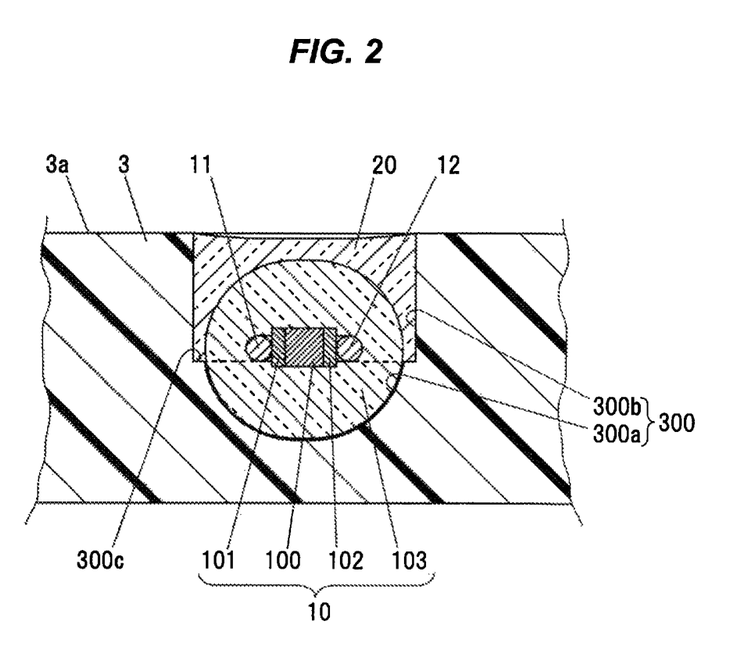
FIG. 2 is a cross-sectional view taken along line A-A in FIG. 1.
Figure 3A:
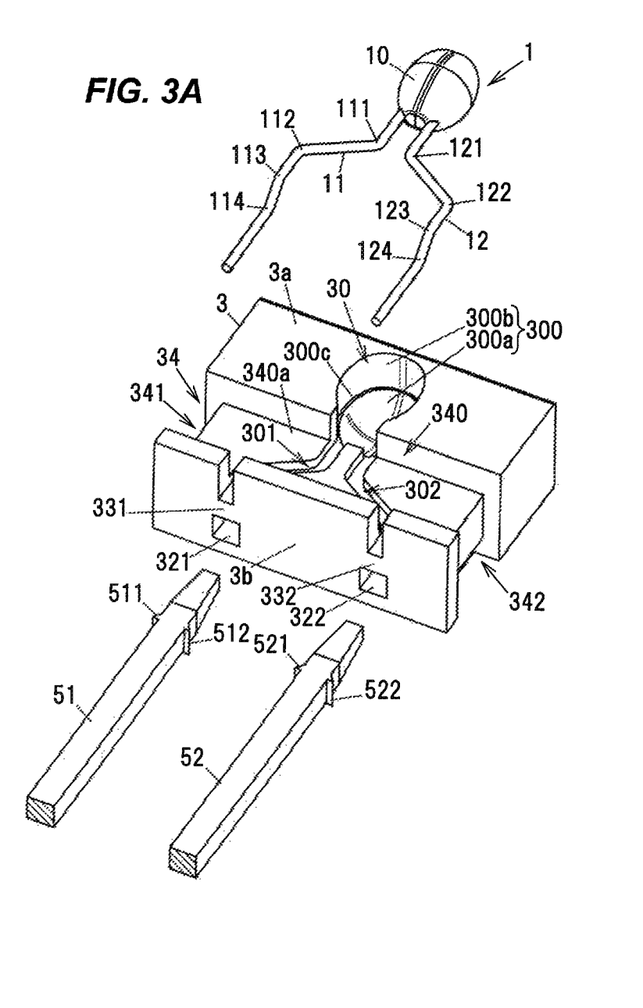
FIGS. 3A and 3B are perspective views showing an assembly process.
Figure 3B:
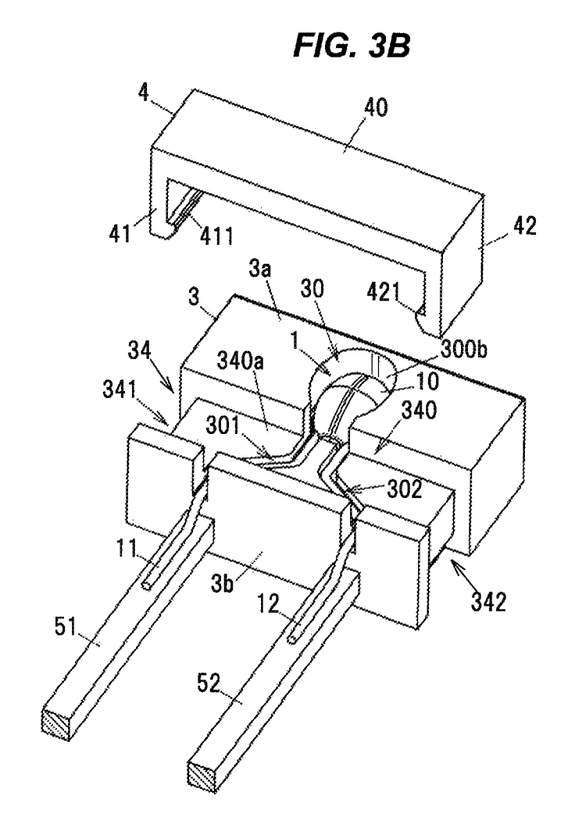
Figure 4A:
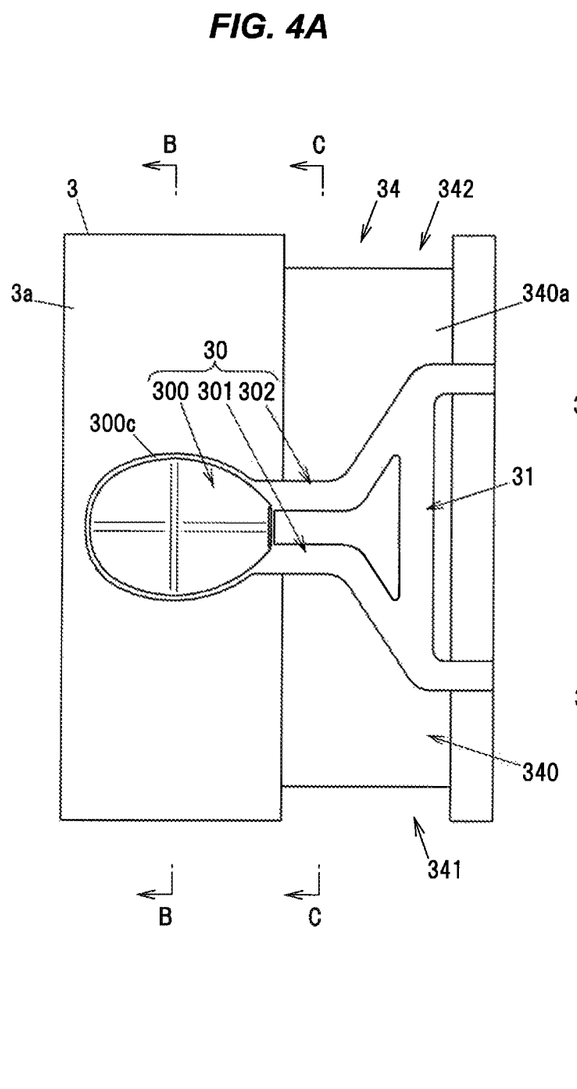
FIGS. 4A and 4B are a front view and a side view showing a main body member of a holder configured to hold the physical quantity sensor.
Figure 4B:
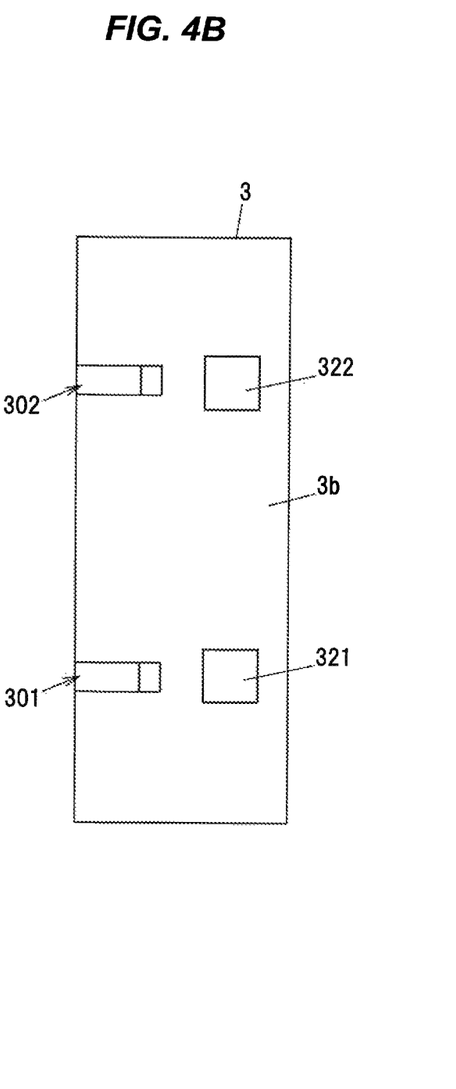
Figure 5A:
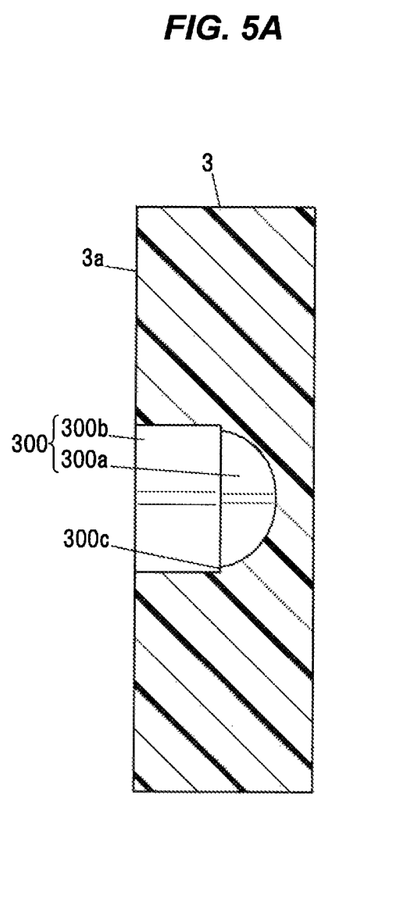
FIG. 5A is a cross-sectional view taken along line B-B in FIG. 4A.
Figure 5B:
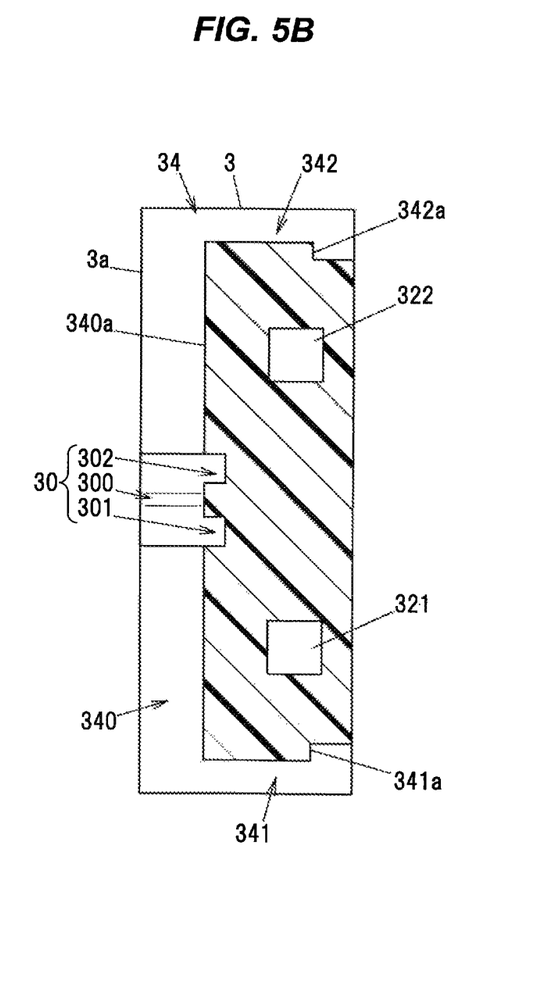
FIG. 5B is a cross-sectional view taken along line C-C in FIG. 4A.

FIG. 1 is a perspective view showing a holder integrated-type physical quantity detection device to which a physical quantity sensor-fixing structure in an embodiment of the invention is applied. FIG. 2 is a cross-sectional view taken along line A-A in FIG. 1. FIGS. 3A and 3B are perspective views showing an assembly process. FIGS. 4A and 4B are a front view and a side view showing a main body member of a holder configured to hold the physical quantity sensor. FIG. 5A is a cross-sectional view taken along line B-B in FIG. 4A and FIG. 5B is a cross-sectional view taken along line C-C in FIG. 4A.

A physical quantity sensor-fixing structure in the present embodiment is configured to fix a physical quantity sensor to plural conductive support members by a holder. Although the case where the physical quantity sensor is a thermistor 1 to detect temperature will be described as an example in the present embodiment, the physical quantity sensor may be, e.g., a thermocouple. In addition, the physical quantity sensor is not limited to a sensor to detect temperature as a physical quantity, and may be, e.g., a magnetic sensor to detect magnetic field intensity.

The thermistor 1 has a detection unit 10 to detect temperature and plural lead wires 11, 12 connected to the detection unit 10. As shown in FIG. 2, the detection unit 10 is composed of a flat plate-shaped sintered metal oxide 100, a pair of electrode plates 101, 102 sandwiching the sintered metal oxide 100, and a sealing body 103 sealing the sintered metal oxide 100 and the pair of electrode plates 101, 102. The sealing body 103 is made of, e.g., a glass sealing material and is formed in an elliptical sphere shape. However, the material or shape of the sealing body 103 is not limited thereto, and an appropriate material or shape can be used.

The lead wires 11, 12 of the thermistor 1 are made of, e.g., a highly-electrical conductive metal in wire shape such as tin-plated copper wire and are arranged in such a manner that respective end portions are connected to the pair of electrode plates 101, 102 of the detection unit 10. The lead wires 11, 12 are bent at four locations, respectively at bent portions 111-114 and bent portions 121-124, as shown in FIG. 3A.

The thermistor 1 is held by a holder 2 composed of a resin. The holder 2 has a main body member 3 having a housing portion 30 to house at least a portion of the thermistor 1 and a lid member 4 covering a portion of the housing portion 30, and is formed in a rectangular parallelepiped shape as a whole. Each of the main body member 3 and the lid member 4 is an injection-molded article made of a resin. As the resin member of the main body member 3, it is preferable to use a material having a thermal conductivity of not less than 1 W/m·K and it is more preferable to use a material having a thermal conductivity of not less than 3 W/m·K.

The holder 2 fixes the thermistor 1 to plural conductive support members 51, 52. The plural conductive support members 51, 52 are, e.g., terminals of a connector, but are not limited thereto and may be, e.g., wires partially protruding outside from a case of an electronic device such as control device. The conductive support members 51, 52 are made of rod-shaped metal conductors having a larger cross-sectional area than the lead wires 11, 12 of the thermistor 1, have higher rigidity than the lead wires 11, 12, and extend parallel to each other.

Other end portions of the lead wires 11, 12 of the thermistor 1 on the opposite side to the end portions connected to the detection unit 10 are respectively connected to the conductive support members 51, 52. The lead wires 11, 12 are connected to the conductive support members 51, 52 by, e.g., welding. However, the lead wires 11, 12 may be connected to the conductive support members 51, 52 by soldering or crimping.

Hereinafter, the lead wire 11, one of the lead wires 11, 12, is referred to as the first lead wire 11 and the other lead wire 12 is referred to as the second lead wire 12. In addition, of the conductive support members 51, 52, the conductive support member 51 connected to the first lead wire 11 is referred to as a first conductive support member 51, and the conductive support member 52 connected to the second lead wire 12 is referred to as a second conductive support member 52.

As shown in FIG. 4, a recess 300 to house the detection unit 10, a first recessed groove 301 to house at least a portion of the first lead wire 11, a second recessed groove 302 to house at least a portion of the second lead wire 12, and a connection groove 31 connecting the first recessed groove 301 to the second recessed groove 302 are formed on the main body member 3. Of those, the recess 300 and the first and second recessed grooves 301, 302 are in communication with each other and form the housing portion 30. In this regard, the connection groove 31 may not be formed on the main body member 3.

As shown in FIGS. 2 and 3A, the recess 300 is composed of a hemispherical bottom-side portion 300a curved along the outline of the sealing body 103 of the detection unit 10 and an opening-side portion 300b located on the opening side relative to the bottom-side portion 300a, and the opening-side portion 300b opens on a flat upper surface 3a of the main body member 3. A step surface 300c is formed at a boundary between the bottom-side portion 300a and the opening-side portion 300b, and the recess 300 is formed in such a manner that an inner diameter of the opening-side portion 300b is larger than an inner diameter of the step surface 300c (the largest inner diameter of the bottom-side portion 300a).

In the present embodiment, the first and second recessed grooves 301, 302 respectively house portions of the first and second lead wires 11, 12, and connections between the first lead wire 11 and the first conductive support member 51 and between the second lead wire 12 and the second conductive support member 52 are made outside the holder 2.

As shown in FIG. 3A, a first fitting hole 321 to house an end portion of the first conductive support member 51 and a second fitting hole 322 to house an end portion of the second conductive support member 52 are formed on the main body member 3. The main body member 3 is fixed to the first and second conductive support members 51, 52 by fitting the first and second conductive support members 51, 52 into the first and second fitting holes 321, 322. The first conductive support member 51 is provided with protrusions 511, 512 to prevent it from slipping out of the first fitting hole 321. Likewise, the second conductive support member 52 is provided with protrusions 521, 522 to prevent it from slipping out of the second fitting hole 322.

The first and second fitting holes 321, 322 are open on a side surface 3b of the main body member 3 that is perpendicular to a longitudinal direction of the first and second conductive support members 51, 52, and the first and second recessed grooves 301, 302 are also open on the side surface 3b. The first and second lead wires 11, 12 are arranged in such a manner that tip portions to be connected to the first and second conductive support members 51, 52 are led out of the holder 2 from ends of the first and second recessed grooves 301, 302 on the side surface 3b side. Portions of the main body member 3 between the first conductive support member 51 and the first recessed groove 301 and between the second conductive support member 52 and the second recessed groove 302 serve as partition wall portions 331, 332 that separate the first and second conductive support members 51, 52 from the first and second recessed grooves 301, 302.

The housing portion 30 (the recess 300 and the first and second recessed grooves 301, 302) is open toward a predetermined direction perpendicular to an alignment direction and a longitudinal direction of the first and second conductive support members 51, 52 in the vicinity of the holder 2 (a direction perpendicular to the paper surface of FIG. 4A and toward the near side of the paper). The first and second lead wires 11, 12 of the thermistor 1 housed in the housing portion 30 are prevented from slipping out of the first and second recessed grooves 301, 302 by the lid member 4.

The lid member 4 has a flat plate portion 40, and a pair of arm portions 41, 42 extending from both longitudinal ends of the plate portion 40 in a direction perpendicular to a longitudinal direction of the plate portion 40 (the alignment direction of the first and second conductive support members 51, 52). The plate portion 40 covers the first and second recessed grooves 301, 302. Locking protrusions 411, 412 engaging with the main body member 3 are respectively provided on the arm portions 41, 42.

A lid member-housing portion 34 to house the lid member 4 is formed on the main body member 3. As shown in FIG. 5B, the lid member-housing portion 34 is composed of a recessed portion 340 to house the plate portion 40 of the lid member 4, and groove portions 341, 342 to respectively house the arm portions 41, 42. The groove portions 341, 342 respectively have locking surfaces 341a, 342a that engage with the locking protrusions 411, 412. The first and second recessed grooves 301, 302 are formed so as to be recessed from a bottom surface 340a of the recessed portion 340. Depths of the first and second recessed grooves 301, 302 from the bottom surface 340a are greater than thicknesses of the first and second lead wires 11, 12. The first and second lead wires 11, 12 housed in the first and second recessed grooves 301, 302 may or may not be in contact with the plate portion 40 of the lid member 4.

The detection unit 10 of the thermistor 1 is fixed to the main body member 3 inside the recess 300 by a curable resin 20. An epoxy resin can be suitably used as the curable resin 20, and it is more preferable to use an epoxy resin particularly having a thermal conductivity of not less than 1 W/m·K. A portion of the curable resin 20 may enter the first and second recessed grooves 301, 302, and may enter between the bottom surface 340a of the recessed portion 340 and the plate portion 40 of the lid member 4.

Next, a procedure for assembling the holder 2 and surrounding parts will be described. This assembly procedure includes a first housing step of placing the thermistor 1 so as to be housed in the housing portion 30 of the main body member 3, a second housing step of placing the lid member 4 so as to be housed in the lid member-housing portion 34 of the main body member 3, an injection step of injecting the curable resin 20 in liquid form before curing into the recess 300 housing the detection unit 10 of the thermistor 1, a fitting step of fitting the first and second conductive support members 51, 52 into the first and second fitting holes 321, 322 of the main body member 3, and a connection step of connecting the first and second lead wires 11, 12 to the first and second conductive support members 51, 52. The order of these steps is not specifically limited, except that the first housing step is performed before the second housing step and the injection step.

A holder integrated-type physical quantity detection device 6, which includes the thermistor 1 and the holder 2 and in which the thermistor 1 is fixed to the first and second conductive support members 51, 52 by the holder 2, is obtained by this assembly procedure.

Effects of the Embodiment

According to the embodiment of the invention described above, the following effects are obtained.

(1) Since the thermistor 1 is housed in the housing portion 30 of the main body member 3 and at least a portion of the housing portion 30 is covered with the lid member 4, the thermistor 1 is prevented from slipping out of the housing portion 30 and is held by the holder 2. This makes it possible to increase support rigidity as compared to when the detection unit 10 of the thermistor 1 is supported by only the first and second lead wires 11, 12.

(2) Since the housing portion 30 has the recess 300 to house the detection unit 10 of the thermistor 1 and the first and second recessed grooves 301, 302 to house the first and second lead wires 11, 12, it is possible to reliably hold the thermistor 1.

(3) The recess 300 and the first and second recessed grooves 301, 302 are open toward a predetermined direction perpendicular to the alignment direction of the first and second conductive support members 51, 52. Therefore, in the first housing step, the thermistor 1 can be easily placed so as to be housed in the housing portion 30 of the main body member 3 and also the first and second lead wires 11, 12 can be arranged respectively along the first and second conductive support members 51, 52 and it is easy to connect therebetween.

(4) Since the first and second lead wires 11, 12 are arranged in such a manner that the tip portions on the opposite side to the detection unit 10 are led out of the holder 2 from the first and second recessed grooves 301, 302 and are connected to the first and second conductive support members 51, 52, work of connecting the first and second lead wires 11, 12 to the first and second conductive support members 51, 52 can be performed reliably in the state in which the thermistor 1 is held by the holder 2.

(5) It is possible to easily fix the main body member 3 to the first and second conductive support members 51, 52 by fitting the first and second conductive support members 51, 52 into the first and second fitting holes 321, 322 of the main body member 3.

(6) Since the main body member 3 has the partition wall portions 331, 332 that separate the ends of the first and second recessed grooves 301, 302 from the first and second fitting holes 321, 322, cracks, etc., on the main body member 3 can be prevented from occurring when the first and second conductive support members 51, 52 are fitted into the first and second fitting holes 321, 322.

(7) Since the detection unit 10 of the thermistor 1 is fixed inside the recess 300 by the curable resin 20, it is possible to firmly fix the detection unit 10 to the main body member 3. In addition, since the recess 300 has the bottom-side portion 300a along the outline of the sealing body 103 of the detection unit 10 and the opening-side portion 300b having a larger inner diameter than the bottom-side portion 300a, the detection unit 10 is reliably positioned by the bottom-side portion 300a and it is possible to ensure that the curable resin 20 spreads around the sealing body 103 in a portion on the opening side relative to the step surface 300c.

(8) Since the lid member 4 has the flat plate portion 40 covering the first and second recessed grooves 301, 302 and the first and second recessed grooves 301, 302 are formed on the main body member 3 so as to be recessed from the bottom surface 340a of the recessed portion 340 which houses the plate portion 40, the first and second lead wires 11, 12 can be reliably prevented from slipping out by the lid member 4.

Summary of the Embodiment

Technical ideas understood from the embodiment will be described below citing the reference numerals, etc., used for the embodiment. However, each reference numeral described below is not intended to limit the constituent elements in the claims to the members, etc., specifically described in the embodiment.

[1] A physical quantity sensor-fixing structure, comprising: a holder (2) holding a physical quantity sensor (thermistor 1) comprising a detection unit (10) to detect a physical quantity and a plurality of lead wires (11, 12) connected to the detection unit (10), the holder (2) fixing the physical quantity sensor (1) to a plurality of conductive support members (51, 52) to be respectively connected to the plurality of lead wires (11, 12), wherein the holder (2) comprises a main body member (3) comprising a housing portion (30) to house at least a portion of the physical quantity sensor (1), and a lid member (4) covering at least a portion of the housing portion (30).

[2] The physical quantity sensor-fixing structure described in [1], wherein a recess (300) to house the detection unit (10) and a plurality of recessed grooves (301, 302) to house at least respective portions of the plurality of lead wires (11, 12) are formed on the main body member (3) in such a manner that the recess (300) is in communication with the plurality of recessed grooves (301, 302).

[3] The physical quantity sensor-fixing structure described in [2], wherein the recess (300) and the plurality of recessed grooves (301, 302) are open toward a predetermined direction perpendicular to an alignment direction of the plurality of conductive support members (51, 52).

[4] The physical quantity sensor-fixing structure described in [2] or [3], wherein the plurality of lead wires (11, 12) are arranged in such a manner that tip portions on an opposite side to the detection unit (10) are led out of the holder (2) from the plurality of recessed grooves (301, 302), and wherein the respective tip portions of the plurality of lead wires (11, 12) are connected to the plurality of conductive support members (51, 52) outside the holder (2).

[5] The physical quantity sensor-fixing structure described in any one of [2] to [4], wherein a plurality of fitting holes (321, 322) to respectively house end portions of the plurality of conductive support members (51, 52) are formed on the main body member (3), and wherein the main body member (3) is fixed to the plurality of conductive support members (51, 52) by fitting the plurality of conductive support members (51, 52) into the plurality of fitting holes (321, 322).

[6] The physical quantity sensor-fixing structure described in [5], wherein the main body member (3) comprises partition wall portions (331, 332) that separate the plurality of fitting holes (321, 322) from ends of the plurality of recessed grooves (31, 32) from which the plurality of lead wires (11, 12) respectively are led out.

[7] The physical quantity sensor-fixing structure described in any one of [2] to [6], wherein the lid member (4) covers the plurality of recessed grooves (301, 302), and wherein the detection unit (10) is fixed inside the recess (300) by a curable resin (20).

[8] The physical quantity sensor-fixing structure described in any one of [2] to [7], wherein the lid member (4) comprises a flat plate portion (40) covering the plurality of recessed grooves (301, 302), wherein a recessed portion (340) to house the plate portion (40) is formed on the main body member (3), and wherein the plurality of recessed grooves (301, 302) are formed so as to be recessed from a bottom surface (340a) of the recessed portion (340).

Although the embodiment of the invention has been described, the invention according to claims is not to be limited to the embodiment described above. Further, please note that not all combinations of the features described in the embodiment are necessary to solve the problem of the invention.

The invention claimed is:

1. A physical quantity sensor-fixing structure, comprising:
a holder holding a physical quantity sensor comprising a detection unit to detect a physical quantity and a plurality of lead wires connected to the detection unit, the holder fixing the physical quantity sensor to a plurality of conductive support members to be respectively connected to the plurality of lead wires,
wherein the holder comprises a main body member comprising a housing portion to house at least a portion of the physical quantity sensor, and a lid member covering at least a portion of the housing portion and covering a portion of the physical quantity sensor,
wherein the lid member does not cover the detection unit and covers only the plurality of lead wires of the physical quantity sensor, and
wherein a recess to house the detection unit and a plurality of recessed grooves to house at least respective portions of the plurality of lead wires are formed on the main body member in such a manner that the recess is in communication with the plurality of recessed grooves.

2. The physical quantity sensor-fixing structure according to claim 1,
wherein the recess and the plurality of recessed grooves are open toward a predetermined direction perpendicular to an alignment direction of the plurality of conductive support members.

3. The physical quantity sensor-fixing structure according to claim 1,
wherein the plurality of lead wires are arranged in such a manner that tip portions on an opposite side to the detection unit are led out of the holder from the plurality of recessed grooves, and wherein the respective tip portions of the plurality of lead wires are connected to the plurality of conductive support members outside the holder.

4. The physical quantity sensor-fixing structure according to claim 1,
wherein a plurality of fitting holes to respectively house end portions of the plurality of conductive support members are formed on the main body member, and wherein the main body member is fixed to the plurality of conductive support members by fitting the plurality of conductive support members into the plurality of fitting holes.

5. The physical quantity sensor-fixing structure according to claim 4, wherein the main body member comprises partition wall portions that separate the plurality of fitting holes from ends of the plurality of recessed grooves from which the plurality of lead wires respectively are led out.

6. The physical quantity sensor-fixing structure according to claim 1, wherein the lid member covers the plurality of recessed grooves, and wherein the detection unit is fixed inside the recess by a curable resin.

7. The physical quantity sensor-fixing structure according to claim 1, wherein the lid member comprises a flat-shaped plate portion covering the plurality of recessed grooves,
wherein a recessed portion to house the flat-shaped plate portion is formed on the main body member, and wherein the plurality of recessed grooves are formed so as to be recessed from a bottom surface of the recessed portion.

8. The physical quantity sensor-fixing structure according to claim 1, wherein the lid member comprises a flat-shaped plate portion covering the plurality of recessed grooves and a pair of arm portions extending from both longitudinal ends of the flat-shaped plate portion in a direction perpendicular to a longitudinal direction of the flat-shaped plate portion,
wherein locking protrusions for engaging with the main body member are respectively provided on the pair of arm portions, and
wherein a pair of locking surfaces that engage with the locking protrusions are provided on an opposite side of the main body member with respect to a side where the plurality of recessed grooves are provided.

9. The physical quantity sensor-fixing structure according to claim 1, wherein the lid member comprises a flat-shaped plate portion covering the plurality of recessed grooves and a pair of arm portions extending from both longitudinal ends of the flat-shaped plate portion in a direction perpendicular to a longitudinal direction of the flat-shaped plate portion.

10. The physical quantity sensor-fixing structure according to claim 1, wherein locking protrusions for engaging with the main body member are respectively provided on a pair of arm portions of the lid member.

11. The physical quantity sensor-fixing structure according to claim 1, wherein a pair of locking surfaces that engage with locking protrusions of the lid member are provided on an opposite side of the main body member with respect to a side where the plurality of recessed grooves are provided.

12. The physical quantity sensor-fixing structure according to claim 1, wherein the lid member comprises a flat-shaped plate portion covering the plurality of recessed grooves.

13. The physical quantity sensor-fixing structure according to claim 1, wherein a recessed portion to house a flat-shaped plate portion of the lid member is formed on the main body member.

14. The physical quantity sensor-fixing structure according to claim 1, wherein the plurality of recessed grooves are formed so as to be recessed from a bottom surface of a recessed portion of the main body member.

15. The physical quantity sensor-fixing structure according to claim 1, wherein the conductive support members comprise metal conductors having a larger cross-sectional area than the plurality of lead wires.

16. The physical quantity sensor-fixing structure according to claim 1, wherein the lid member is formed in a rectangular parallelepiped shape as a whole,
wherein each of the main body member and the lid member is an injection-molded article comprised of a resin.

17. The physical quantity sensor-fixing structure according to claim 1, further comprising a lid member-housing portion to house the lid member is formed on the main body member.

18. A physical quantity sensor-fixing structure, comprising:
a holder holding a physical quantity sensor comprising a detection unit to detect a physical quantity and a plurality of lead wires connected to the detection unit, the holder fixing the physical quantity sensor to a plurality of conductive support members to be respectively connected to the plurality of lead wires,
wherein the holder comprises a main body member comprising a housing portion to house at least a portion of the physical quantity sensor, and a lid member covering at least a portion of the housing portion and covering a portion of the physical quantity sensor,
wherein the lid member does not cover the detection unit and covers only the plurality of lead wires of the physical quantity sensor, and
wherein the conductive support members comprise rod-shaped metal conductors having a larger cross-sectional area than the plurality of lead wires, have higher rigidity than the plurality of lead wires and extend parallel to each other.

19. A physical quantity sensor-fixing structure, comprising:
a holder holding a physical quantity sensor comprising a detection unit to detect a physical quantity and a plurality of lead wires connected to the detection unit, the holder fixing the physical quantity sensor to a plurality of conductive support members to be respectively connected to the plurality of lead wires,
wherein the holder comprises a main body member comprising a housing portion to house at least a portion of the physical quantity sensor, and a lid member covering at least a portion of the housing portion and covering a portion of the physical quantity sensor,
wherein the lid member does not cover the detection unit and covers only the plurality of lead wires of the physical quantity sensor; and
a lid member-housing portion to house the lid member is formed on the main body member,
wherein the lid member-housing portion is comprised of a recessed portion to house a plate portion of the lid member, and groove portions to respectively house arm portions of the lid member, and
wherein the groove portions respectively have locking surfaces that engage with locking protrusions provided on the arm portions of the lid member.

* * * * *